United States Patent [19]

Motooka

[11] Patent Number: 4,695,722
[45] Date of Patent: Sep. 22, 1987

[54] OPTICAL SCANNER ERROR COMPENSATOR

[75] Inventor: Wesley D. Motooka, Irvine, Calif.

[73] Assignee: Ford Aerospace & Communications Corporation, Detroit, Mich.

[21] Appl. No.: 855,974

[22] Filed: Apr. 25, 1986

[51] Int. Cl.$^4$ .......................... H04N 1/04; G01B 11/26
[52] U.S. Cl. ..................................... 250/235; 250/347; 356/431; 358/293
[58] Field of Search ............... 250/235, 347, 201, 234, 250/236, 548; 356/431; 358/293; 350/6.5, 6.91

[56] References Cited

U.S. PATENT DOCUMENTS

| | | | |
|---|---|---|---|
| 3,622,788 | /1971 | Briggs | 356/152 |
| 3,697,183 | 10/1982 | Knight et al. | 250/237 |
| 3,783,271 | 1/1974 | Abbott, Jr. et al. | 250/203 R |
| 4,129,775 | 12/1978 | O'Meara | 250/203 R |
| 4,203,672 | 5/1980 | Smith, Jr. | 250/235 |
| 4,314,154 | 2/1982 | Minoura et al. | 358/293 |
| 4,383,173 | 5/1983 | Neil et al. | 356/397 |
| 4,404,596 | 9/1983 | Juergensen et al. | 358/293 |
| 4,467,186 | 8/1984 | Goralnick et al. | 250/201 |
| 4,471,447 | 9/1984 | Williams et al. | 250/201 |
| 4,475,182 | 10/1984 | Hosaka | 250/201 |
| 4,484,073 | 11/1984 | Ohara et al. | 250/347 |
| 4,490,608 | 12/1984 | Yeadon et al. | 358/293 |
| 4,502,783 | 3/1985 | Lau et al. | 356/152 |
| 4,578,577 | 3/1986 | Noguchi | 250/235 |

Primary Examiner—Edward P. Westin
Assistant Examiner—Charles Wieland
Attorney, Agent, or Firm—Edward J. Radlo; Keith L. Zerschling

[57] ABSTRACT

An optical projection system, e.g., an imaging infrared system, is compensated for errors caused by scan-to-scan jitter, framing jitter, vibrational effects, and scan nonlinearities. One or two closed control loops compensate for errors associated with mirrors (32, 52) of the optical projection system. In the scan control loop, a set of scan reference marks (75) in a reference plane (7) is superimposed onto a scan position detector (59) lying in a plane (10) containing a detector array (9), producing a scan error compensation signal (56). For wide scan fields of view (72), the scan position detector (59) comprises two pairs (94, 95) of triangular detectors, and means (86) for periodically switching therebetween. In the cross-scan control loop, a cross-scan reference mark (73) in the reference plane (7) is superimposed onto a cross-scan position detector (39), preferably comprising a pair of substantially identical triangular detectors (91, 92), lying in the detector plane (10), producing a cross-scan position error signal (36).

10 Claims, 11 Drawing Figures

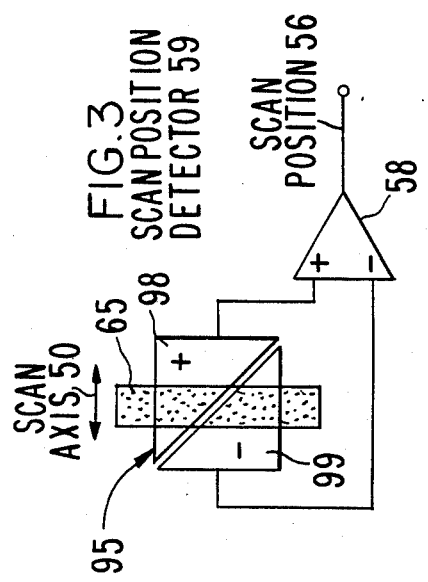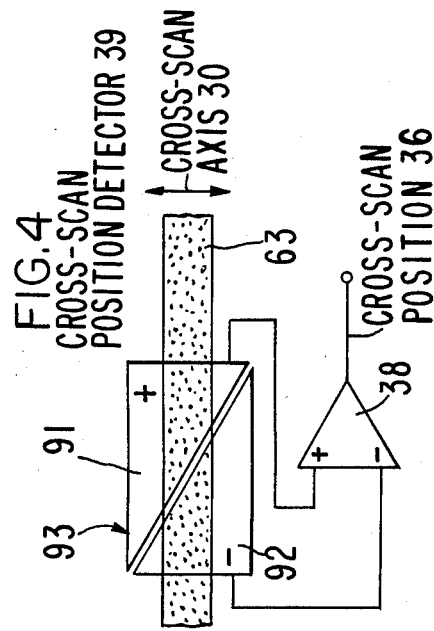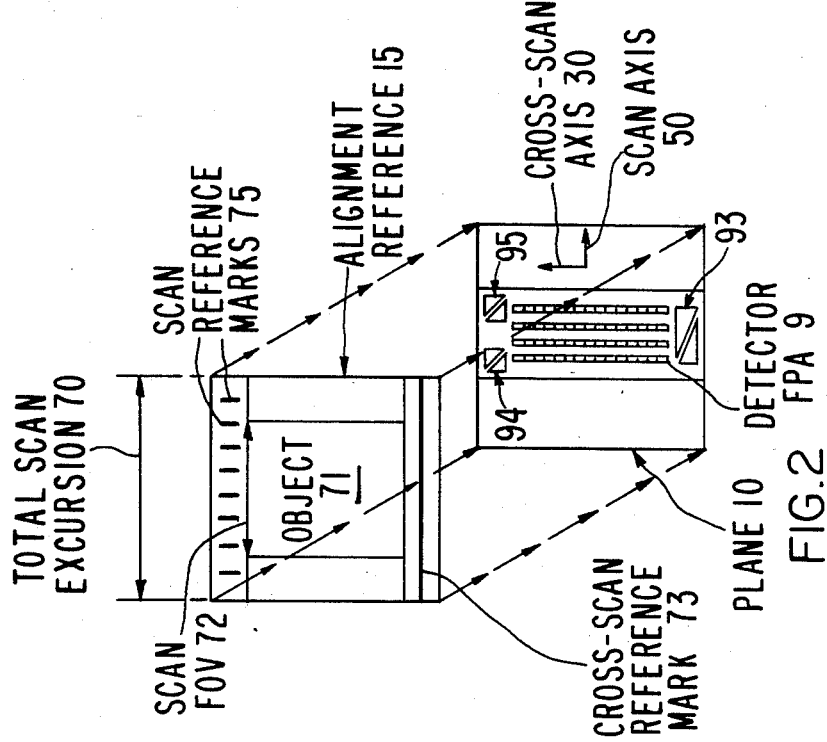

DESIRED MOVEMENT OF SCAN MIRROR 52

OPTICAL SCANNER ERROR COMPENSATOR

DESCRIPTION

1. Technical Field

This invention pertains to the field of closed loop compensation of angular distortion, jitter, and scan nonlinearity errors in high accuracy optical imaging systems, such as those employing infrared sensors.

2. Background Art

U.S. Pat. No. 3,622,788 discloses a search and track system that differs from the present invention in that the reference does not have the imaging capability of the present invention. The reference system cannot be used for scan linearization because of its inherently limited bandwidth capability. For scan compensation, the reference system provides only timing information, not continuous information as in the present invention. The reference system uses chevron (angled) detectors to enable the apparatus to boresight onto the target in the elevation direction in the fine (tracking) mode.

U.S. Pat. No. 4,383,173 discloses an infrared radiation detecting system in which a cross-hair technique is used to keep optics pointed at a target. In other words, it is an infrared gunsight. It is an open-loop system, not a closed-loop system as in the present invention. It cannot be used for scan linearization or fine stabilization as in the present invention because the rate at which the graticule moves on the detector plane is the same as the rate at which the target moves on the detector plane. In the present invention, a high bandwidth is achieved (i.e., high frequency errors can be compensated for) because error correction information is generated at a much faster rate than the rate of movement of scanning mirror 52.

U.S. Pat. No. 4,467,186 discloses a closed-loop servo system for pointing mirrors, but not the scanning of the present invention. The reference device does not perform imaging as in the present invention. The purpose of the reference is simply to keep MPM assembly 20 pointed at a target. The present invention is not concerned with the presence or absence of a target; one purpose of the present invention is to image uniformly throughout the scanning field of view.

In another prior art approach, mirrors actuated by galvos are used as part of an optically projecting means. Sensors associated with each galvo are used to sense the position of the associated mirror. The sensors may be capacitive pick-offs or ones using back EMF on the galvo coil. Information from the sensors is fed back to the servo controller to repoint the mirror. Compared with the techniques of the present invention, these prior art approaches are highly nonlinear, and thus are suitable for relatively coarse stabilization only.

Secondary references are U.S. Pat. Nos. 3,697,183; 3,783,271; 4,129,775; 4,471,447; 4,475,182; and 4,502,783.

3. Disclosure of Invention

In a reference image plane (7) is an image field (object) (71) that is projected by optical means (13, 52, 32, 14) onto a planar detector array (9), which converts the image field (71) into an electrical representation. Lying in the reference plane (7) is an elongated reference mark (73). In the detector plane (10) is a position detector (39) comprising an optical displacement sensor (93) which generates an error compensation signal (36) proportional to the degree of linear misalignment between the projection (63) of the reference mark (73) onto the optical displacement sensor (93). This error signal (36) is compensated and fed back to an actuator (3) of a mirror (32) to inhibit pointing errors. The mirror (32) may be used for starting or for narrow field-of-view scans.

In the case where the optical means comprises a second, scanning mirror (52), so that a wide field-of-view (72) of the object (71) may be imaged onto the detector (9), a second position detector (59) comprising a second optical displacement sensor (94, 95) in the reference plane has projected thereonto a set of scan reference marks (75) that are orthogonal to the aforementioned reference mark (73). The scan position detector (59) generates a scan error compensation signal (56) which is compensated and fed back to the actuation means (5) of the scanning mirror (52), enabling closed loop high bandwidth scan linearization and fine stabilization.

BRIEF DESCRIPTION OF THE DRAWINGS

These and other more detailed and specific objects and features of the present invention are more fully disclosed in the following specification, reference being had to the accompanying drawings (all of which illustrate various aspects of the present invention), in which:

FIG. 2 is a sketch showing how elements in alignment reference 15 superimpose (project) onto elements associated with the plane 10 of detector array 9;

FIG. 3 is a sketch showing elements associated with a first embodiment of scan position detector 59;

FIG. 4 is a sketch showing elements associated with cross-scan position detector 39;

BEST MODE FOR CARRYING OUT THE INVENTION

Figure 1:
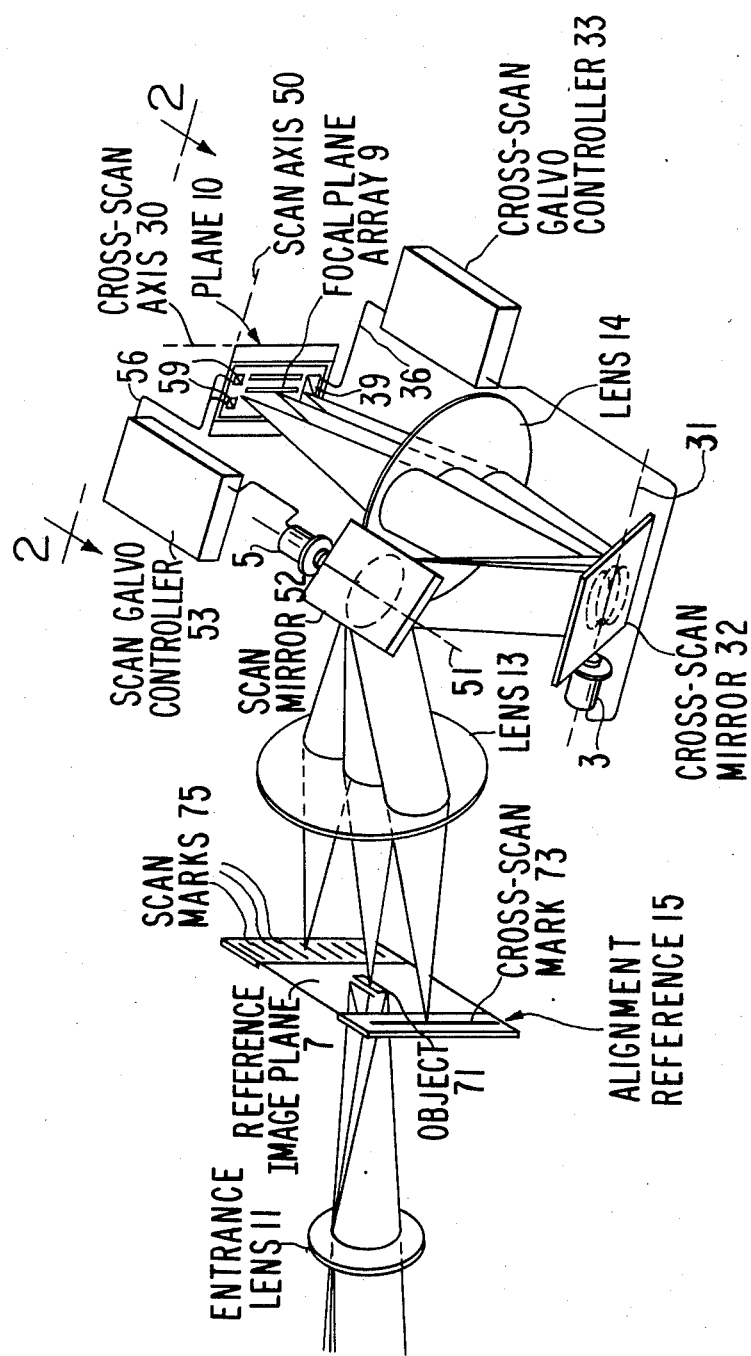
FIG. 1 is an isometric overview of an optical imaging system employing both control loops of the present invention.

The invention is illustrated for a scanning imaging optical system having two mirrors 52, 32 and two lenses 13, 14 which project an object 71 onto a detector plane 10 comprising a focal plane array detector 9. (FIG. 1). Any nominal optical beam expander (not illustrated here), used in conjunction with an entrance lens 11 (thus forming an imaging telescope), places the optical manifestation of the object 71 onto a reference image plane 7.

Mirror 52 is normally scanning in a sawtooth pattern by means of partially rotating about its shaft 51, which causes relative motion between the optical projection of object 71 and detector 9 along scan axis 50. Hence, mirror 52 is called the "scan mirror". This sawtooth scanning enables the imaging of object 71 by detector 9.

Figure 9:
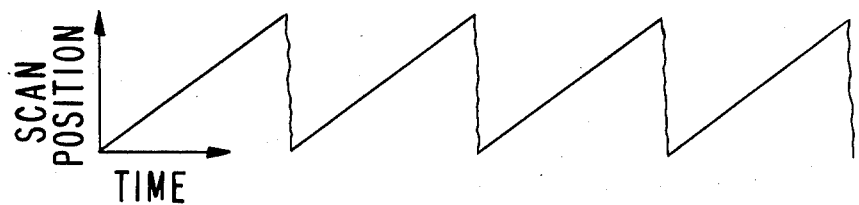
FIG. 9 is a graph of scan position versus time for desired movement of scan mirror 52.

FIG. 9 shows the desired movement of scan mirror 52. Mirror 32 is normally stationary but is free to partially rotate about its shaft 31 (which is orthogonal to shaft 51), which causes relative motion between object 71 and detector 9 along cross-scan axis 30, which is octhogonal to scan axis 50. Hence, mirror 32 is called the "cross-scan mirror".

Detector 9 is illustrated as comprising a set of many detector elements organized into a series of columns. The direction of scan is such that the projection of object 71 is scanned across the columns; the rows can be interlaced or noninterlaced.

Associated with mirrors 32 and 52 are motive means 3, 5, respectively, which may be galvanometers, for angularly positioning the corresponding mirror 32, 52. Both galvos 3, 5 correct for position errors that arise, e.g., from irregularities in the optical path between object 71 and detector 9; non-linearities in the galvos 3, 5; and for vibration, which can be random. Since, in an airborne environment, these vibrational errors can occur at relatively high frequencies, say 300 Hz, the system described herein is designed to correct errors with a servo bandwidth of at least 300 Hz. In addition, the scan feedback loop (59, 53, 5) provides real time closed loop dynamic scanning calibration for mirror 52, which compensates for nonlinearities in the scan motion imparted by means 5.

An elongated cross-scan reference mark 73 is positioned in the reference plane 7 outside of the field occupied by object 71. Similarly, several scan reference marks 75, equally spaced and orthogonal to cross-scan reference mark 73, are also located in the reference plane 7 outside of the field occupied by object 71. These marks 73, 75 can be suspended from a frame or mounted on a substrate, thus forming alignment reference 15.

In the case where infrared detection is desired, marks 73, 75 can be embodied as wires through which current is passed to generate sufficient heat to be detected by optical displacement sensors 93, 94, 95. Alternatively, alignment reference 15 can comprise a mirror which reflects cold from a dewar associated with detector array 9. In this case, reference marks 73, 75 are scratches on the mirror. The scratches scatter ambient radiation, thus forming the signal.

If the system is meant to be operable at visible frequencies, marks 73, 75 could be, e.g., light emitting diodes. Alternatively, marks 73, 75 could be projected onto alignment reference 15 from a remote source. For purposes of convenience, displacement sensors 93–95 are typically fabricated of the same material as the detectors in focal plane array 9.

In the plane 10 containing detector 9 are elements of a cross-scan position detector 39 and a scan position detector 59, which detect linear misalignments along the cross-scan and scan axes 30, 50, respectively. Error compensation signals 36, 56 produced by these detectors 39, 59, respectively, are fed back in a negative feedback fashion to the actuators 3, 5, respectively.

FIG. 2 shows that the projection of the scan field of view 72 can be wider than detector array 9. The total scan excursion 70 is wider still. Cross-scan optical displacement sensor 93 is shown as a pair of triangular detectors 91, 92 (FIG. 4). The triangles 91, 92 are substantially identical and have their hypotenuses facing each other across a narrow gap. The outer periphery of the triangle pair 93 is substantially a rectangle.

FIG. 4 shows the operation of the cross-scan error detection. The projection 63 of reference mark 73 is shown as centered on sensor 93 comprising triangular detectors 91 and 92, which are electrically coupled to the noninverting and inverting input terminals, respectively, of difference amplifier 38. The signal produced by each of the triangular detectors 91, 92 is proportional to the area of projection 63 onto said detector 91, 92. This area is a linear function of the distance along cross-scan axis 30 of projection 63, which in turn is a linear function of the angular displacement of mirror 32 about its shaft 31. As a result of these geometries, the voltage 36 at the output of differential amplifier 38 is proportional to said angular displacement about shaft 31. Voltage 36 conveys sign as well as magnitude information; it is zero when projection 63 is centered on sensor 93.

Projection 63 being offset from the midline of sensor 93 corresponds to an alignment error along cross-scan axis 30, and causes the generation of a nonzero error signal 36. This voltage 36 is compensated (inverted and phase shifted) and fed back to galvo 3 to complete the feedback loop. The system is designed so that projection 63 always falls within the rectangular shape of sensor 93, whatever the excursions of mirrors 32 and 52.

For detection and correction along scan axis 50, FIGS. 1, 2, 5 and 6 illustrate embodiments in which scan position detector 59 comprises two pairs 94, 95 of triangular detectors. Composite sensor 94, 95 is centered with respect to the scan direction (along scan axis 50) in the detector plane 10 to minimize the number of scan reference marks 75, which are illustrated as being eight in number.

The operation of scan error detection will now be illustrated by reference to the FIG. 3 embodiment, in which just one pair 95 of triangular detectors 98, 99 and one scan reference mark 75 are employed. This amount of hardware would be sufficient to perform scan error detection if the scanning field of view 72 were very small. The operation of detectors 98, 99 is identical to that of detectors 91, 92, described above, except that relative motion between the projection 65 of the reference mark 75 and the detector pair 95 is along scan axis 50. The electrical outputs from detectors 98 and 99 are fed to the noninverting and inverting input terminals, respectively, of difference amplifier 58, which outputs scan position signal 56 having magnitude and sign information and centered on zero (corresponding to projection 65 being left-to-right centered on sensor 95).

If the optical projection system requires a relatively wide scanning field of view 72, one pair 95 of triangular detectors is insufficient to perform the scan error detection, because even the maximum size that triangular detectors 98, 99 can be made is still not big enough to accommodate the required geometries. Thus, a second pair 94 of triangular detectors 96, 97 is used, as shown in FIGS. 1, 2, 5, and 6. The number of scan reference marks 75 is that required to cover the entire scan, and is eight in the illustrated embodiments.

Figure 5:
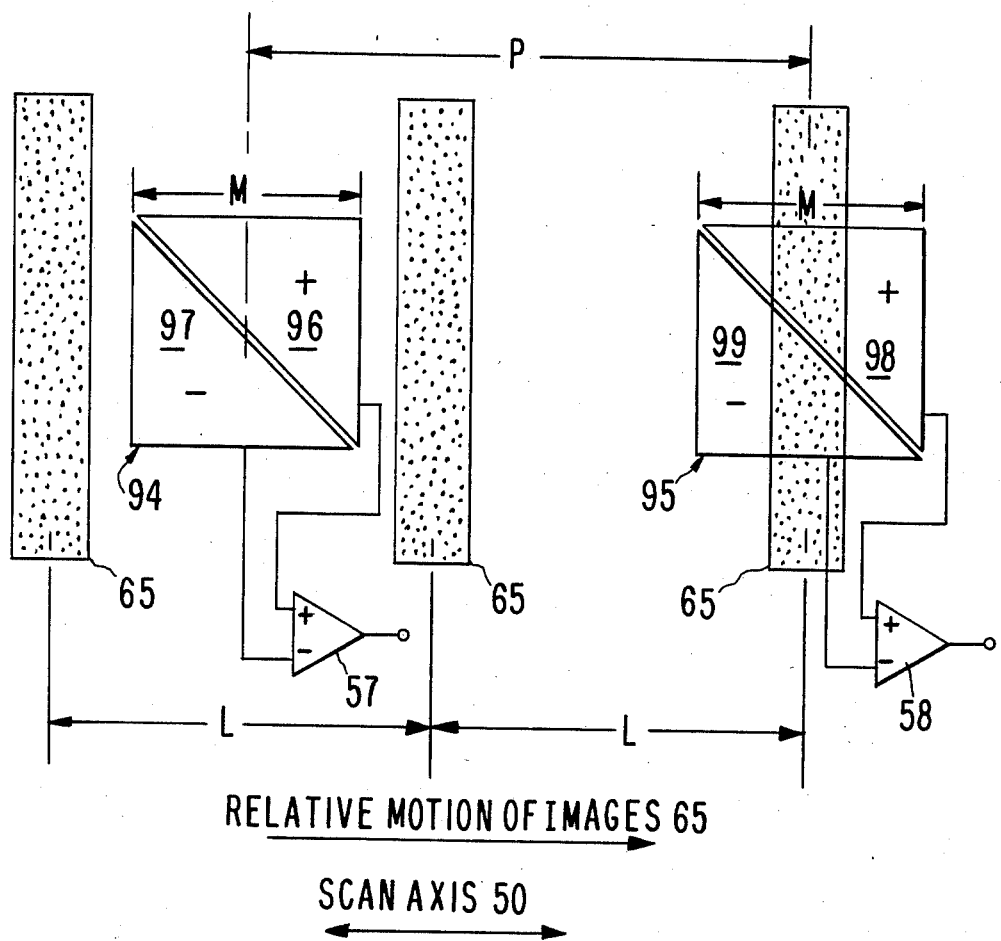
FIG. 5 is a sketch showing elements associated with a second embodiment of scan position detector 59.

The embodiment illustrated in FIGS. 1, 2, and 5 has the detector pairs 94, 95 side-by-side. L is the distance between the equispaced scan mark projections 65; M is the width of the rectangular periphery of each detector pair 94, 95; and P is the distance between the midpoints of the detector pairs 94, 95. The relationship between L and M must be such that no more than one projection 65 is over the useful (linear) portion of a sensor (94 or 95) simultaneously. Otherwise, compensation signal 56 would be undesirably nonlinear. Also, P must equal $(2n+1)L/2$, where n is any positive integer, so that one projection 65 will be centered over one sensor (94 or 95)

while the other sensor (95 or 94) is between projections 65.

Figure 6:
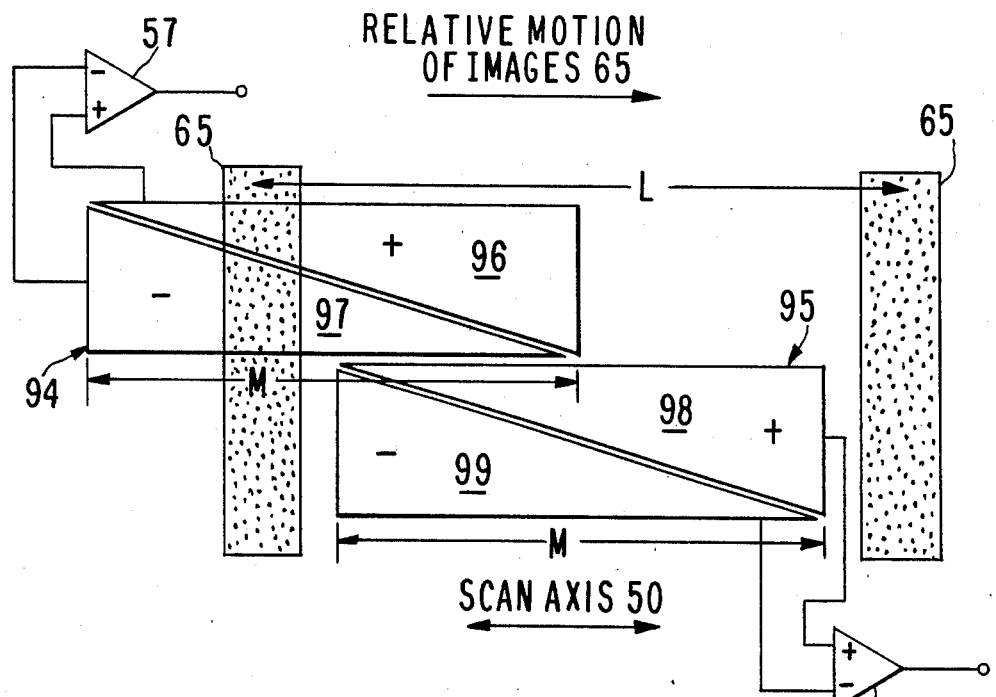
FIG. 6 is a sketch showing elements associated with a third embodiment of scan position detector 59.

In the FIG. 6 embodiment, sensors 94 and 95 are staggered. Sensor 94 is offset in the scan direction a distance M/2 from sensor 95. Again, to avoid nonlinearities in compensation signal 56, L must be sufficiently greater than M so that no more than one projection 65 is over a sensor (94 or 95) simultaneously. Also, L must be less than 3M/2 so that one mark 75 is always over a sensor 94 or 95.

In the twin sensor 94, 95 embodiments, a second difference amplifier 57 is used and is associated with sensor 94. Triangular detectors 96 and 97 are coupled to the noninverting and inverting input terminals, respectively, of amplifier 57.

Figure 7:
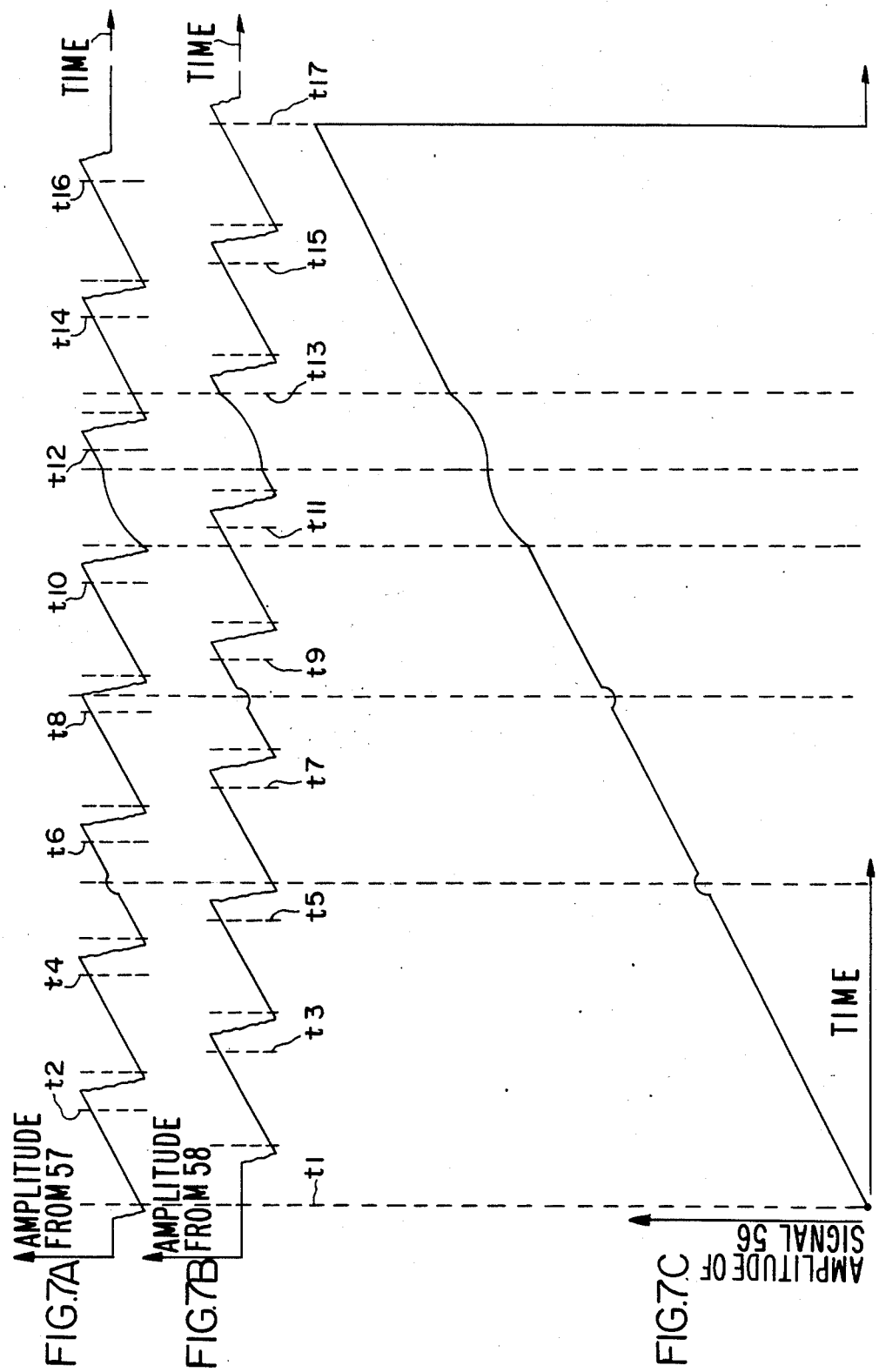
FIG. 7 (a, b and c) is a set of three graphs, corresponding to the FIGS. 5 and 6 embodiments, showing amplitude from amplifier 57 as a function of time, amplitude from amplifier 58 as a function of time, and scan error compensation signal 56 amplitude versus time, respectively.

FIG. 7 illustrates the twin sensor 94, 95 embodiment where projections 65 scan across detector array 9 from left to right. FIG. 7A illustrates the output amplifier 57 as the eight projections 65 scan across detector array 9. This waveform is generally in the shape of a sawtooth centered around zero volts, and ranging from −V to +V. The sawtooth comprises eight linear ramp portions, corresponding to the eight projections 65 and reference marks 75, separated by areas within dashed lines, corresponding to times when one projection 65 is leaving sensor 95 and another projection 65 is just starting over it. Information from within these dashed regions is deemed unreliable. A positive perturbation (exaggerated for clarity) is shown between times t4 and t6. A positive scan nonlinearity is present prior to time t12.

Similarly, FIG. 7B is a graph of the amplitude of the signal emanating from amplifier 58. FIG. 7B is similar to FIG. 7A except it is offset an amount of time equivalent to a scan of L/2. A negative perturbation (exaggerated for clarity) is shown between times t7 and t9. A negative scan nonlinearity is present prior to time t13.

Figure 8:
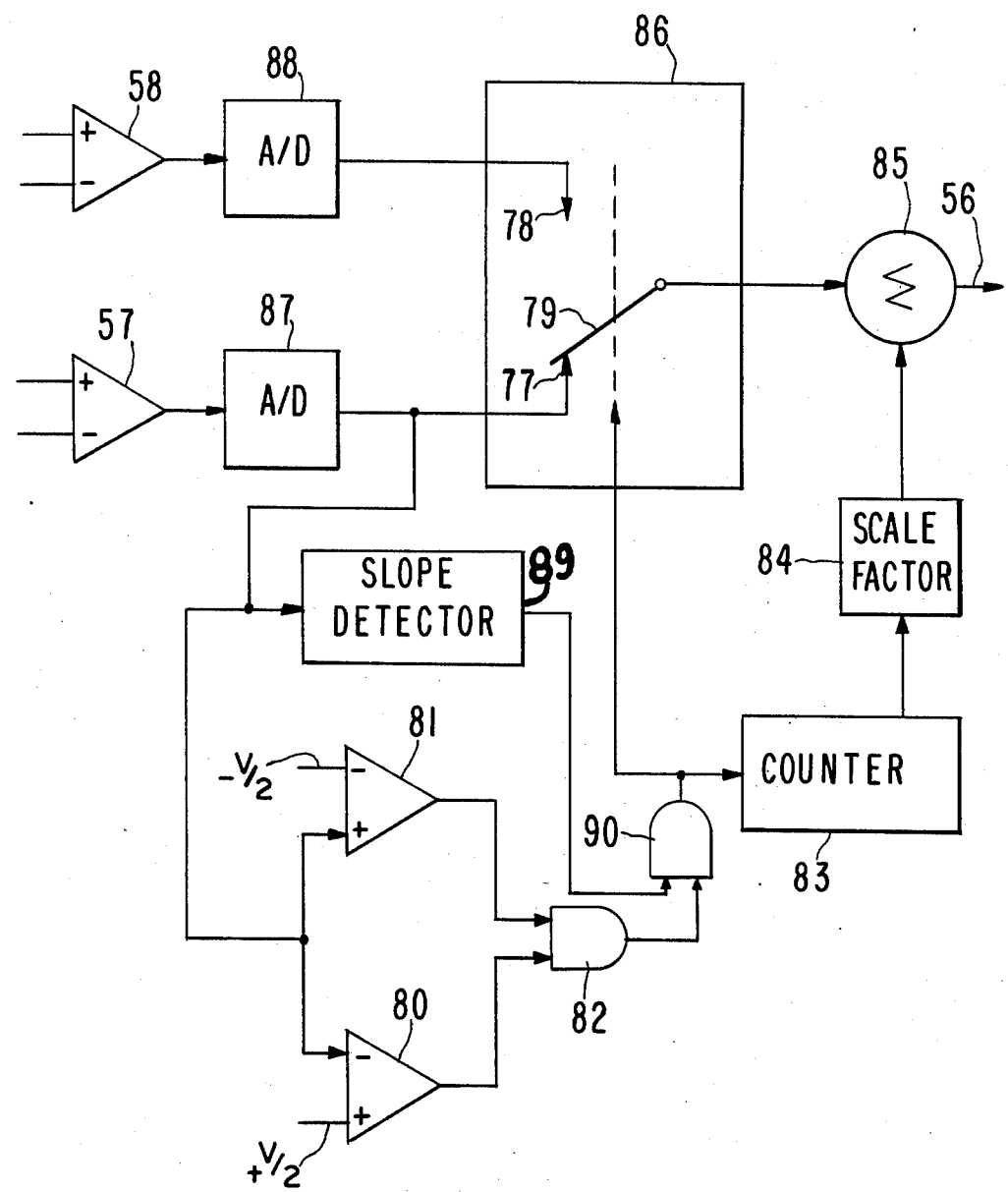
FIG. 8 is a conceptual block diagram, corresponding to the FIGS. 5 and 6 embodiments, showing apparatus for combining information obtained from amplifiers 57 and 58 to generate the scan error compensation signal 56.

FIG. 8 illustrates a conceptual circuit which combines information from FIGS. 7A and 7B to produce FIG. 7C wherein information from the unreliable portions of 7A and 7B within dashed lines is avoided. Note that the perturbations and nonlinearities present in FIGS. 7A and 7B have been propagated to FIG. 7 at equivalent times.

The FIG. 8 circuit begins by selecting information from amplifier 57. When the voltage reaches V/2, which is just before time t2, switch 86 switches to select the digitized output from amplifier 58. This becomes the signal fed to digital adder 85 until the signal from 58 reaches V/2. This corresponds to the signal from 57 being −V/2, and occurs just before time t3. At this point, switch 86 couples the signal from amplifier 57 to adder 85. In general, the signal from 57 is selected when it is between −V/2 and +V/2. This is the position of switch 86 illustrated in FIG. 8.

Analog-to-digital converters 88 and 87 digitize the outputs of differential amplifiers 58 and 57, respectively. A/D converters 88, 87 operate at a frequency much higher than the expected error perturbation frequency, permitting real-time fine stabilization and scan linearization. The output of A/D converter 87 is fed to the digital equivalent of a window comparator, schematically shown as comprising comparators 80, 81 and AND gate 82. Specifically, the output from A/D converter 87 is fed to the functional equivalents to a noninverting input terminal of comparator 81 and the inverting input terminal of comparator 80. The inverting input terminal of comparator 81 is biased to −V/2 and the noninverting input terminal of comparator 80 is biased to +V/2. The outputs of the functional comparators 80, 81 are the inputs to AND gate 82, the output of which is one of the inputs to AND gate 90.

The output of comparator 80 is high when the amplitude of the signal from amplifier 57 is less than V/2. Similarly, the output of comparator 81 is high when the amplitude of the signal from amplifier 57 is greater than −V/2. Thus, the output of AND gate 82 is high when the output from amplifier 57 is within the amplitude window (between −V/2 and +V/2).

A slope detector 89 is coupled between the output of A/D converter 87 and the input side of AND gate 90. The output of slope detector 89 is high when the signal from amplifier 57 is rising, and is low when the signal from amplifier 57 is falling. For example, slope detector 89 is a circuit which samples the amplifier 57 output at a preselected number of points (say 5), and compares the amplitude of the signal at all 5 sampled points. If signal 57 is rising at all five points, a high output is declared.

The output of AND gate 90 controls the pole 79 of switch 86 and feeds the input of counter 83. When the output of AND gate 90 is high, pole 79 is connected to terminus 77 (as illustrated in FIG. 8), and thus the signal from amplifier 57 is fed to adder 85. When the output of AND gate 90 is low, pole 79 is connected to terminus 78 and the output from amplifier 58 is fed to adder 85.

The output from AND gate 90 is high when and only when the signal from amplifier 57 is within the −V/2 to +V/2 amplitude window and is rising. The FIG. 8 circuit deems that detector pair 95 is reliable at these moments. On the other hand, the output from AND gate 90 is low when the signal from amplifier 57 is outside the amplitude window, or is falling (e.g., because it is within the dashed line regions of FIG. 7A).

Counter 83 counts and outputs to scale factor 84 the number of the ramp (of curve 7A or 7B), by means of counting every time the output of AND gate 90 has changed state (and hence the number of times switch 86 has switched). Scale factor 84 multiplies the ramp number by an appropriate scale factor corresponding to the slope of the ramps, and inputs this to adder 85 where it is added to the input from switch 86. By this technique, negative feedback signal 56 is made to be one continuous ramp as desired, rather than a sawtooth. Counter 83 also contains a comparator to test, each time the output of 82 changes state, for whether the number of ramps has reached the total for a scan (here 16). When this number is reached, this indicates that the scan has been completed; the output of counter 83 is reset to zero at this occurrence, forcing signal 56 to zero.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention For example, the fine stabilization system described herein can be nested within a conventional coarse stabilization system. In such a case, the fine and coarse systems can advantageously be made to share the same set of gimbals.

What is claimed is:

1. Apparatus for compensating for errors introduced into an optical scanning system, said apparatus comprising:

a reference plane comprising an object to be projected;

a detector, lying in a detector plane, for converting the object into electrical signals;

means for optically scanning the object onto the detector;

lying in the reference plane, an elongated reference mark;

lying in the detector plane, a first optical displacement sensor generating a first error compensation signal proportional to the degree of linear misalignment between said first optical displacement sensor and the projection of the reference mark thereonto, and hence the misalignment between the object and the detector, along a first axis; and means for controlling said optical scanning means in accordance with said first error compensation signal in order to compensate for said misalignment.

2. The apparatus of claim 1 wherein the first optical displacement sensor comprises a pair of substantially identical triangular detectors associated with positive and negative misalignments, respectively.

3. Apparatus of claim 2 wherein one of the triangular detectors is coupled to a noninverting input terminal of a difference amplifier, the other of the triangular detectors is coupled to an inverting input of the difference amplifier, and the output of the difference amplifier is the first error compensation signal.

4. Apparatus of claim 2 wherein the pair of triangular detectors has an outer periphery generally in the shape of a rectangle, said detectors being arranged so that the hypotenuses of the triangles face each other across a narrow gap.

5. The apparatus of claim 4 wherein the width of the reference mark is no greater than the small dimension of the rectangle, and the entire width of the projection of the reference mark in the detector plane falls within said small dimension at all times.

6. Apparatus of claim 1 wherein the optically projecting means scans the object onto the detector plane in a direction orthogonal to the length of the reference mark, and the first optical displacement sensor is long enough that the projection of the reference mark in the detector plane falls onto the first optical displacement sensor during all phases of the scan.

7. Apparatus of claim 1 further comprising:
lying in the detector plane, a second optical displacement sensor; and
lying in the reference plane, at least one elongated tick mark that is orthogonal to the reference mark; wherein
the optically scanning means causes projections of the tick marks in the detector plane to scan across the second optical displacement sensor such that the projection of one of the tick marks is positioned over the second optical displacement sensor during all phases of the scan; whereby
a time-continuous signal representative of scan axis position is produced, said time-continuous signal being fed back to the optically scanning means to enable high bandwidth scan linearization.

8. The apparatus of claim 7 wherein the second optical displacement sensor comprises first and second pairs of triangular detectors, each of the pairs having an outer periphery generally in the shape of a rectangle.

9. The apparatus of claim 8 wherein the number of tick marks is at least two, and the entire width of one of the tick mark projections falls onto one of the detector pairs at all times during the scan.

10. Apparatus of claim 8 further comprising:
a difference amplifier coupled to each detector pair; and
means for switching between outputs of the two amplifiers based upon which of the detector pairs is covered by the entire width of the projection of a tick mark.

* * * * *